US006412535B1

(12) United States Patent
Barilovits et al.

(10) Patent No.: US 6,412,535 B1

(45) Date of Patent: Jul. 2, 2002

(54) LABEL APPLICATION UNIT

(75) Inventors: Joseph Barilovits, Simpsonville; John Barilovits, Gray Court, both of SC (US)

(73) Assignee: Barvit Industrial, LLC, Simpsonville, SC (US)

( * ) Notice: Subject to any disclaimer, the term of this patent is extended or adjusted under 35 U.S.C. 154(b) by 0 days.

(21) Appl. No.: 09/522,975

(22) Filed: Mar. 10, 2000

(51) Int. Cl.[7] ........................ B32B 31/00; B32B 31/04; B65C 9/26

(52) U.S. Cl. ....................... 156/362; 156/351; 156/541; 156/542; 156/556; 156/DIG. 37

(58) Field of Search ................................ 156/540, 541, 156/542, 497, 351, 356, 357, 362, 556, 557, 559, 560, DIG. 27, DIG. 33, DIG. 37

(56) References Cited

U.S. PATENT DOCUMENTS 4,332,635 A * 6/1982 Holbrook et al. ........... 156/256
4,337,108 A * 6/1982 Crankshaw et al. ........ 156/285
4,390,386 A * 6/1983 Bartl .......................... 156/235
4,612,076 A * 9/1986 Moss ......................... 156/249
4,844,771 A * 7/1989 Crankshaw et al. ........ 156/387
4,954,203 A * 9/1990 Matsumoto ................. 156/361
5,232,539 A * 8/1993 Carpenter et al. .......... 156/360
5,232,540 A * 8/1993 Southwell et al. .......... 156/361
5,271,783 A * 12/1993 Potter .......................... 156/86

* cited by examiner

*Primary Examiner*—Richard Crispino
*Assistant Examiner*—Sue A. Purvis

(57) ABSTRACT

A unit for applying labels at predefined designated locations along the length of a moving web of material. The unit includes one or more label discharge mechanisms which remove labels from a carrier backing for discharge to a defined placement zone. The label discharge mechanisms are actuatable in response to commands from a controller to effect placement of the labels at designated locations along the length of the web. The controller initiates actuation of the label discharge mechanisms according to a variable timing sequence which is a function of the rate of travel of the moving web to which the label is applied such that label application takes place as the designated location to be labeled passes through the placement zone. The unit is adjustable to apply labels to webs traveling at different angles.

18 Claims, 6 Drawing Sheets

FIG. –1–

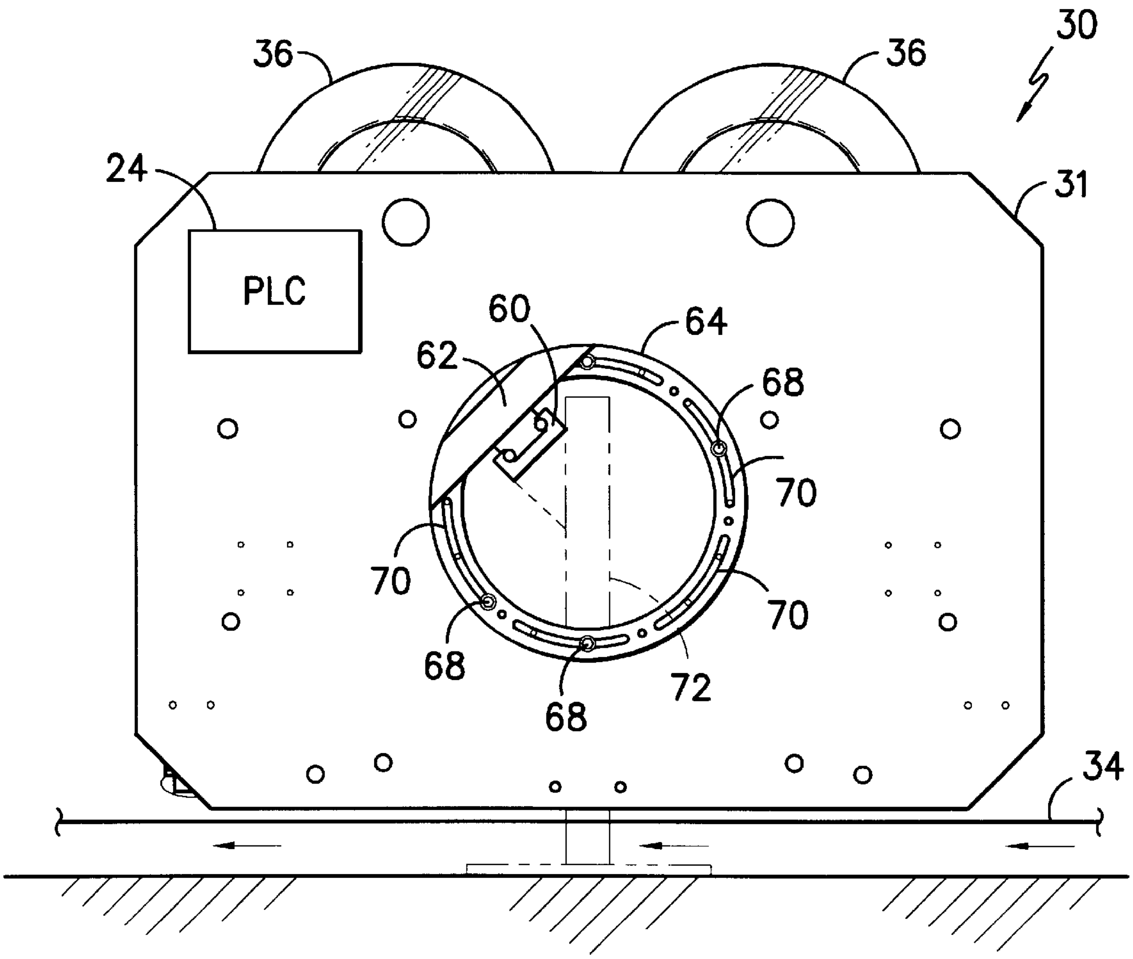
FIG. –4–

LABEL APPLICATION UNIT

TECHNICAL FIELD

The present invention relates to a unit for applying labels to a surface, and more particularly to a unit for applying labels at designated locations along the length of a moving web of material so as to mark such locations.

BACKGROUND OF THE INVENTION

The production of a number of materials such as paper, films, textiles, and floor coverings, is carried out by forming such materials as elongated webs of substantial length which are thereafter segmented by cutting to yield lengths which are usable by the customer. While the character of the material along the length of the web may appear to be uniform, in many instances there will be variations along the length of such webs. These variations may arise for example in the form of slightly modified construction techniques which are intentionally introduced and/or in the form of either instantaneous or running defects within the material forming the web.

As will be appreciated by those of skill in the art, following production of the web material, the web will typically undergo an inspection process to identify the location and nature of variations along its length. Such inspection may be performed either manually and/or through use of automated equipment. One such automated system for the identification of variations along the length of a material web is believed to be available from Elbit Vision Systems which is believed to have a place of business in Tel Aviv, Israel.

Based upon the inspection of the web material produced, a listing of the variations along the length of the web may be generated. Such a listing is commonly referred to as a defect map. The map typically identifies the location, duration, and nature of the variations identified along the length of the material web. This data is typically stored in a retrievable registry format referred to by those of skill in the art as a defect album.

While the web materials which are formed are generally of extremely long length, the ultimate users of such materials oftentimes require lengths which are much shorter than the lengths formed during the production process. Moreover, the quality standards for different users may vary such that certain defects will be permissible to some users while being unacceptable to others. In recognition of the need to segment the web of material to yield shorter lengths of character and quantity as may be required by the various users, such production webs typically undergo what is referred to as a debatching process. During the debatching process the web is segmented and allocated for delivery to various customers. Such segmentation and allocation is typically carried out using the information from the map of variations along the length of the material web so as to deliver material which conforms to the product specifications of the various purchasers. The segmented lengths of material are typically placed into a roll form for delivery to the user.

As will be appreciated, in the event that the material being formed is a textile, the segmented webs of textile material which are shipped to the user may be subject to further cutting to yield panels of material which are thereafter incorporated into garments or other final structures being produced. In order to assist the users of such materials in efficiently conducting such further cutting, it is known to place removable labels at locations along the length of the material to identify the location and duration of any anomaly or other variation as may be present along the length of the material web. Such labels are typically placed in overhanging relation to the edge of the material web such that a portion of the label will protrude outwardly from the end of the roll of material shipped to the user. By way of example only, in the event that there is a running defect along some lengths of the material provided to the user, labels may be placed at the origin and the termination of the length of material affected by such running defect so as to alert the user of the material to the presence of such defect thereby permitting him or her to cut around the defect or to otherwise adjust production accordingly.

Although the use of labels to identify the location and duration of variations along the length of a material web is generally known, the actual placement of such labels at the proper location has heretofore been difficult to achieve. Such difficulty has typically arisen as a result of variations in the speed with which the material web travels during the debatching process. Moreover, the label application devices which have been previously available have generally been large, cumbersome units which are not versatile in assuming different operating configurations as may be required based on the layout and availability of space along the path of travel for the material web to be marked.

SUMMARY OF THE INVENTION

It is a general object of the present invention to provide an application unit for the precise disposition of labels at designated locations along the length of a web of material when such web of material is moving at variable rates of speed.

It is a further object of the present invention to provide an application unit for the disposition of labels at designated locations along the length of a moving web of material which application unit incorporates angular adjustment for placement along inclined portions of the conveyance path for such web of material.

According to a potentially preferred feature of the present invention, the application unit includes a label discharge mechanism which is operatively connected to a controller which actuates the label discharge mechanism according to a variable timing sequence as a function of the rate of travel of the web of material.

According to a further feature of the present invention, the application unit for applying labels at designated locations along the length of a moving web of material utilizes an articulating reversible vacuum grid as the discharge mechanism to place the label at a designated location.

According to a further feature of the present invention, the application unit preferably includes dual label discharge mechanisms each of which is independently operable from the other.

According to a further feature of the present invention, the application unit includes a label placement verification sensor to confirm proper placement and adhesion of the label.

According to one aspect of the present invention an application unit for applying labels at designated locations along the length of a moving web of material is provided. The application unit includes one or more label discharge mechanisms in the form of reversible vacuum grids which accept labels from a carrier backing for placement along the length of the moving material web. The label discharge mechanisms are actuatable in response to commands from a controller to place labels at designated locations. The controller initiates actuation of the label discharge mechanisms according to a variable timing sequence which is a function of the rate of travel of the moving web to which the label is applied. The variable timing sequence is calculated based upon the time lag between actuation of the label discharge mechanism and completion of the label placement and the amount of material which is transmitted past the label discharge mechanism during such time lag given the rate of travel of the material web. Such rate variable actuation thereby permits placement of the label at the precise location desired regardless of the actual rate of web travel.

Accordingly, the present invention provides useful advantages and alternatives over the prior art.

While the invention has been generally described and will hereafter be illustrated and more fully described in connection with certain potentially preferred embodiments, it is to be understood that the invention is in no way limited to such illustrated and described embodiments. To the contrary, it is contemplated that persons of skill in the art may make modifications to such preferred embodiments within the scope of the invention. Thus it is the intention of the applicants to cover all such alternatives and modifications as may fall within the true spirit and scope of the invention.

BRIEF DESCRIPTION OF THE DRAWINGS

An embodiment of the present invention is described below, by way of example only, with reference to the accompanying drawings in which:

FIG. 4 is a rear view of the label application unit according to the present invention.

DESCRIPTION OF THE PREFERRED EMBODIMENTS

Figure 1:
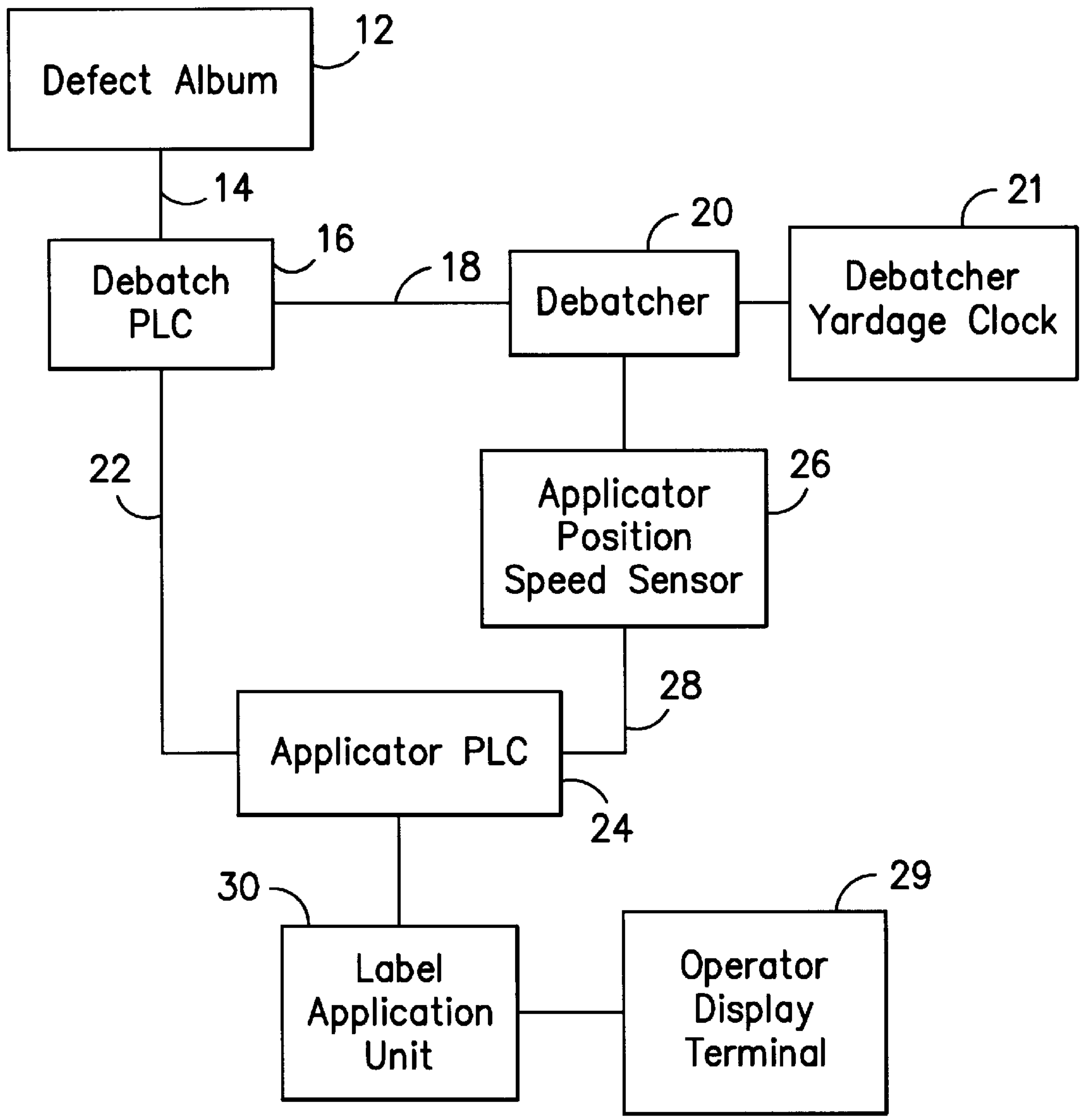
FIG. 1 is a block diagram of a web debatching arrangement in which the label application unit according to the present invention may be utilized.

Turning now to the figures, wherein like elements are designated by like reference characters throughout the various views, in FIG. 1 there is illustrated in block diagram form an arrangement of components for a debatching and label application process. According to the illustrated arrangement, a defect album 12 comprising a listing of the location, duration, and nature of defects or other variations along the length of the material web to undergo debatching is provided. The defect album is operatively connected via an appropriate communications link 14 to a debatch programmable logic controller 16 as is well known to those of skill in the art. The debatch programmable logic controller 16 is operatively connected via an appropriate communications link 18 to the debatching unit 20 which typically includes a yardage clock 21 which monitors the movement of the material through the debatching unit 20. The debatching unit 20 receives instructions from the debatch programmable logic controller 16 regarding the discharge and segmentation of the material web based upon the location and nature of defects within the web of material as listed on the defect album 12. Through use of the yardage clock 21 the debatching unit 20 correlates the instructions from the debatch programmable logic controller 16 to the actual position of the web of material within the debatching unit 20 so as to perform segmentation at the proper location. As will be appreciated, the instructions from the debatch programmable logic controller 16 preferably incorporate an optimization function to optimize the use of available material within the web. Such optimization programs are well known to those of skill in the art and constitute no portion of the invention herein.

As illustrated, the debatch programmable logic controller 16 preferably includes a data link 22 to a label applicator programmable logic controller 24. The applicator programmable logic controller 24 is thereby provided with data regarding the location along the length of the web where labels are to be applied. One potentially preferred unit as may be used for the applicator programmable logic controller 24 is a model IC693 UDR005-P1 series 90 micro PLC manufactured by the General Electric Company having a place of business in Fairfield Conn., USA.

As will be appreciated, The debatching unit 20 may operate at different speeds during the debatching process. Thus, in order to provide the applicator programmable logic controller 24 with sufficient data to identify the speed of the web and the position of locations to be marked along the web of material, a position speed sensor 26 is preferably utilized. By way of example only, the position speed sensor 26 may be a rotational meter which rides on the web to be marked as will be well known to those of skill in the art. As the rate of dispatch of the web from the debatcher varies, the position speed sensor communicates the instantaneous rate to the applicator programmable logic controller 24 via a communications link 28. Thus, the applicator programmable logic controller 24 can at all times establish the position of any point along the length of the web to be marked. The applicator programmable logic controller is thereby able to actuate the label applicator 30 to place labels at locations identified by the defect album 12. As illustrated, the operation of the label applicator 30 may be monitored at an operator display terminal 29.

Due to the fact that the label application constitutes the physical process of placing a label on the web to be marked, some finite period of time hereafter referred to as lag time exists between the time that the applicator programmable logic controller actuates the label applicator 30 and the time that the label application process is completed. In the event that the label applicator 30 utilizes a forced air discharge of the label as described further hereinafter, it is believed that the lag time will be about 15 to 20 milliseconds. While such lag time is relatively short, it must nonetheless be accounted for in order to achieve precision in label placement. While the lag time has no affect in the labeling of a stationery web and will have little affect on labeling of a slow moving web, the lag time may become relevant to the precision of label placement in those applications where the web is traveling at a very high rate of speed.

According to the preferred embodiment of the present invention, the applicator programmable logic controller 24 accounts for the lag time and the resultant impact on label placement through the calculated early actuation of the label application unit 30 according to a speed variable actuation timing sequence. That is, the timing for the actuation of label placement is a function of the rate of travel of the web to be marked. Accordingly, when the web to be marked is moving quickly, the label applicator will be actuated to begin label placement before the location to be marked reaches the application zone for the label application unit 30. The faster the web is moving, the more space is allotted between the position to be marked in the label application zone. According to a preferred form of the invention, this distance will be substantially equivalent to the distance traveled by the web during the lag time of the label application unit 30. Thus, through calculated premature actuation based upon instantaneous rate of web travel, any change to such rate may be accounted for.

Figure 2:
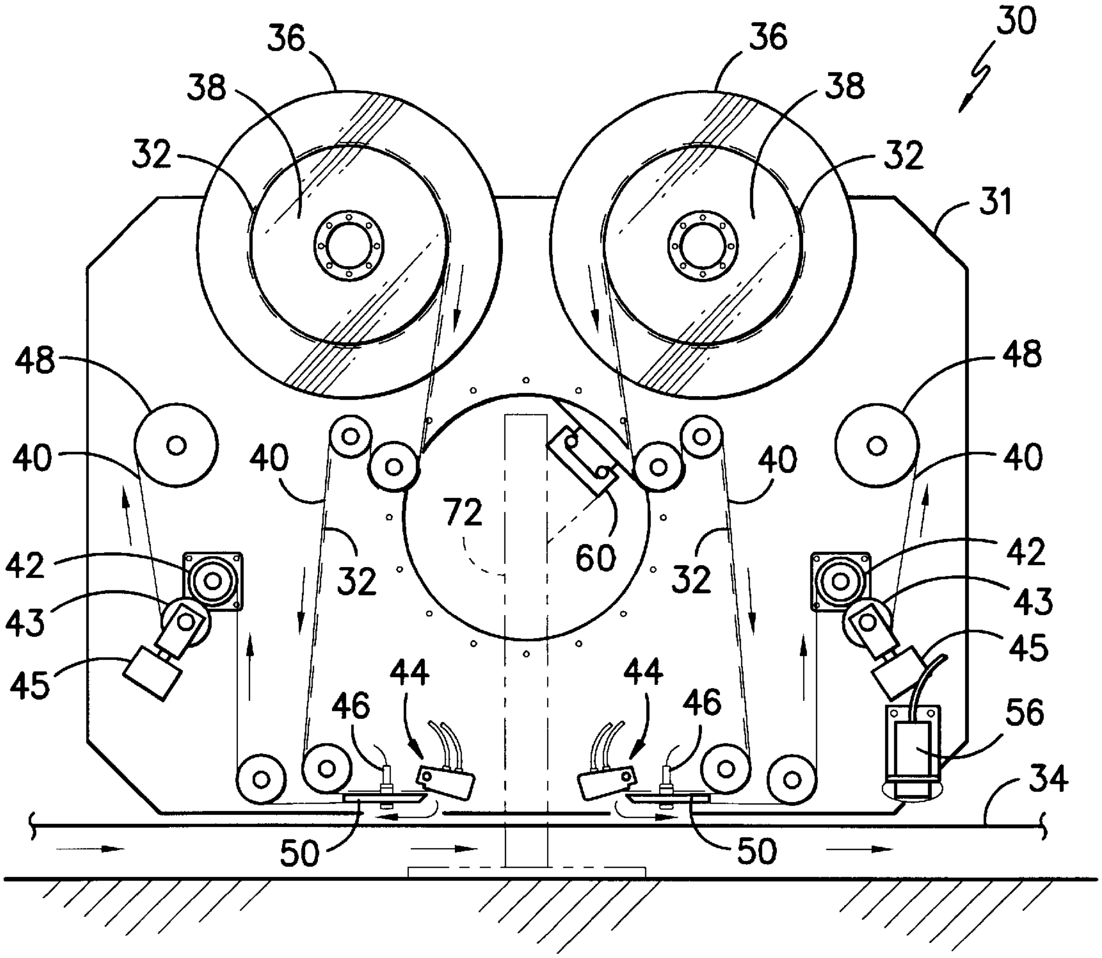
FIG. 2 is a front view of a label application unit according to the present invention.

In FIG. 2, there is illustrated a side view of a potentially preferred embodiment of the label application unit 30 according to the present invention. As illustrated, according to the potentially preferred embodiment of the present invention, the label application unit 30 includes two substantially identical systems mounted in mirror image orientation to one another on a support frame 31 for application of label elements 32 to a moving web 34. However, it is likewise contemplated that the label application unit 30 may incorporate either a larger or smaller number of systems. Moreover, in the event that two or more application systems are incorporated, it is contemplated that such systems may be operated either independently or in conjunction with one another. As will be appreciated, the applicator programmable logic controller 24 may be mounted on the support frame 31 or may be separate.

As illustrated, each of the application systems preferably includes a spool device 36 for the storage and disposition of a tape roll 38. The tape roll 38 is formed from windings of a carrier tape 40. As illustrated, the label elements 32 are disposed on one side of the carrier tape 40 so as to be on the exterior of the tape roll 38 as the tape roll 38 is unwound. The label elements 32 are preferably held in place at regular spacing along the length of the carrier tape 40 by a releasable adhesive.

According to a potentially preferred practice, the label elements 32 are of a substantially rectangular configuration having a length dimension of about 2 inches and a width dimension of about 1 inch. The releasable adhesive is preferably patterned across the underside of the label elements 32 such that the region along the length dimension adjacent either end of the label elements is substantially free of adhesive. In the event that the label element is 2 inches in length, the adhesive free region preferably extends about 5⁄16 inches inwardly from either end such that adhesive covers the remaining 1 and 3⁄8 inches across the interior of the label. The use of such patterned label elements 32 permits the adhesive free portion to protrude away from the edge of the marked web of material thereby reducing the possibility for undesired adhesion to a foreign surface. The use of label elements 32 having no adhesive on either end provides the added advantage of eliminating the potential for operator error when loading the tape roll 38 onto the spool device 36.

In the illustrated and potentially preferred embodiment, the carrier tape 40 is withdrawn from the tape roll 38 by the application of a pulling force initiated by a stepper motor 42 which is periodically activated by the applicator programmable logic controller 24 as required to feed discrete label elements 32 to a label discharge device 44 for application of the label 32 to the moving web 34. The applicator programmable logic controller 24 may immediately or after a delay activate the stepper motor 42 after each label is applied thereby providing the label discharge mechanism 44 with a new label for subsequent application in a manner to be described further hereinafter. In operation, the stepper motor 42 will be activated immediately if the need to place the next label 32 is imminent, while a delay will be imposed if a label is not required for application for some predetermined period of time.

The pulling force applied by the stepper motor 42 is discontinued once the new label has been fed to the label discharge mechanism 44. Termination of the stepper motor 42 is preferably based upon a signal provided to the applicator programmable logic controller 24 from an optical sensor 46 indicating that the label has been fed to the label discharge mechanism 44. The carrier tape 40 is preferably taken up by a motor driven take-up spool 48 which is operable in conjunction with the stepper motor 42. In the illustrated and potentialy preferred embodiment, a floating nip roll 43 is used to prevent slippage between the carrier tape 40 and the stepper motor 42. The floating nip roll 43 is preferably held in place by a compressible cylinder support 45. In the event that the carrier tape 40 should break and begin to accumulate around the stepper motor, the floating nip roll is forced back by the accumulating tape thereby compressing the cylinder support. Once such compression reaches a predetermined level, a limit switch is tripped thereby sending a fault signal to the operator display terminal 29 and terminating further operation of the stepper motor 42 until the carrier tape 40 is arranged properly.

One potentially preferred stepper motor 42 for use in the label applicator 30 according to the present invention is believed to be the model PK268-03A oriental 6 lead stepper motor which is believed to be available from General Controls Electronics, Inc., having a place of business in Elk Grove Village, Ill., USA. One potentially preferred take-up motor 48 is a model UTAM4-0101S Taiyo pneumatic piston motor. The optical sensor 46 is preferably a model D12EP6FP banner label photoelectric sensor in combination with a model PDIS46UM12 banner plastic fiber assembly which detects the presence or absence of a label element 32.

Figure 3A:
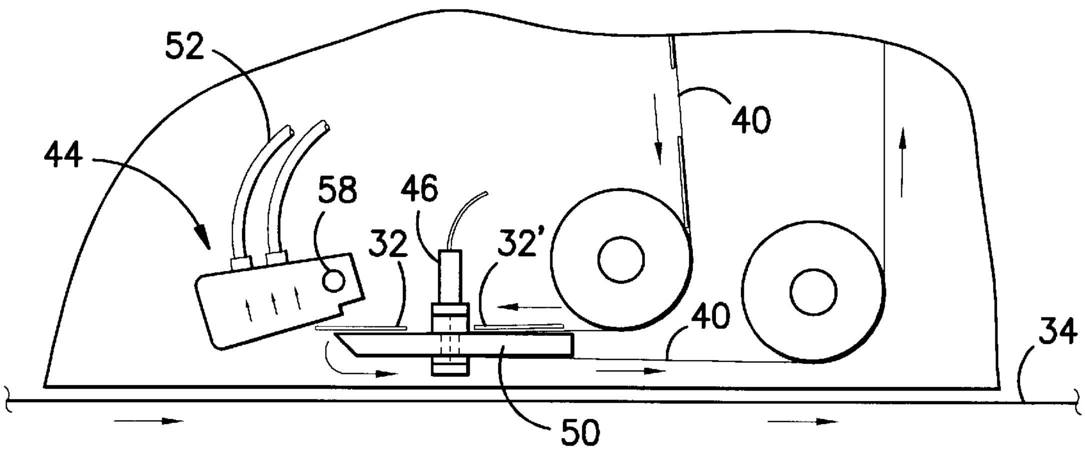
FIGS. 3A–3D illustrate the operation of a label discharge mechanism for use in a label application unit according to the present invention.
Figure 3B:
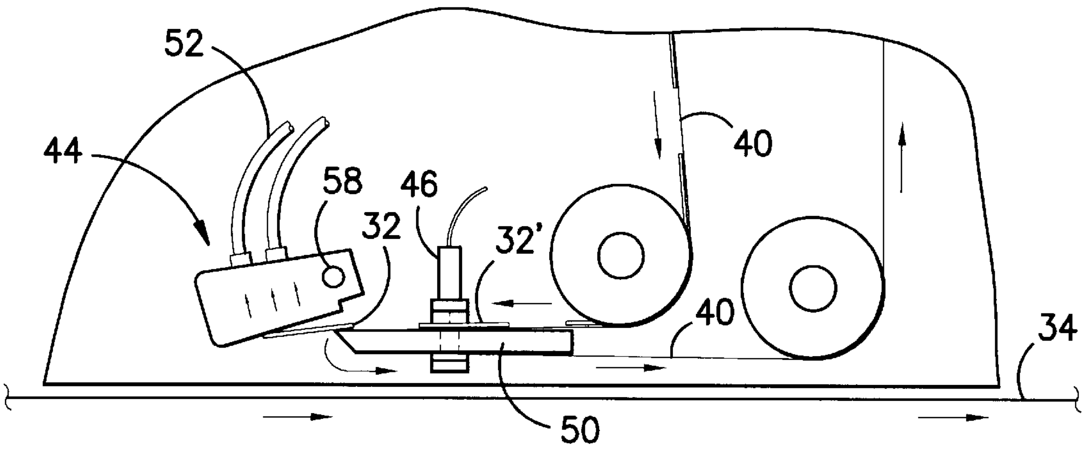

The physical procedure for placement of individual label elements 32 onto the moving web 34 is illustrated in FIGS. 3A–3D. As shown in FIG. 3A, a carrier tape 40 carrying a plurality of discrete label elements is preferably conveyed around the nose of the take-off plate 50. As best illustrated in FIG. 3B, as the carrier tape 40 bends around the nose of the take-off plate 50 so as to reverse direction away from the label discharge mechanism 44, the leading label element 32 tends to peel away from the carrier tape 40. This peeling away phenomenon arises due to the fact that the adhesive which holds the label element 32 to the carrier tape 40 is of a releasable nature such that the shear forces applied between the label element 32 and the carrier tape 40 which arise as the carrier tape 40 is conveyed around the radius of curvature formed by the nose of the take-off plate 50 are sufficient to overcome the adhesive bond between the label element 32 and the carrier tape 40. As will be appreciated, the releasable nature of the adhesive on the label element 32 is likewise useful in permitting the removal of the label element 32 from the material forming the moving web 34 at later stages of material processing.

As the leading label element 32 is peeled away from the carrier tape 40, it will tend to continue in a path of travel generally parallel to the upper surface of the take-off plate 50. According to the illustrated and potentially preferred embodiment of the present invention, this continued conveyance brings the label element 32 into contact with the underside of the label discharge mechanism 44 (FIG. 3B). As shown, the angle of the label discharge mechanism 44 relative to the conveyed label element 32 is such that contact is assured between the label element 32 and the underside of the label discharge mechanism 44.

The label discharge mechanism is preferably an articulating vacuum grid which includes a plurality of flexible feed lines 52 which are operatively connected to a vacuum pump (not shown) such as an M20G6-MN Piab vacuum generator. This vacuum pump is of such a nature that a vacuum may be pulled across the label discharge mechanism 44 at a level sufficient to hold a label element 32 in place against the underside of the discharge mechanism 44. Thus, at the position as generally illustrated in FIG. 3B, the label element 32 is prevented from falling by a combination of both its internal stiffness as well as the vacuum force applied through the label discharge mechanism 44.

Figure 3C:
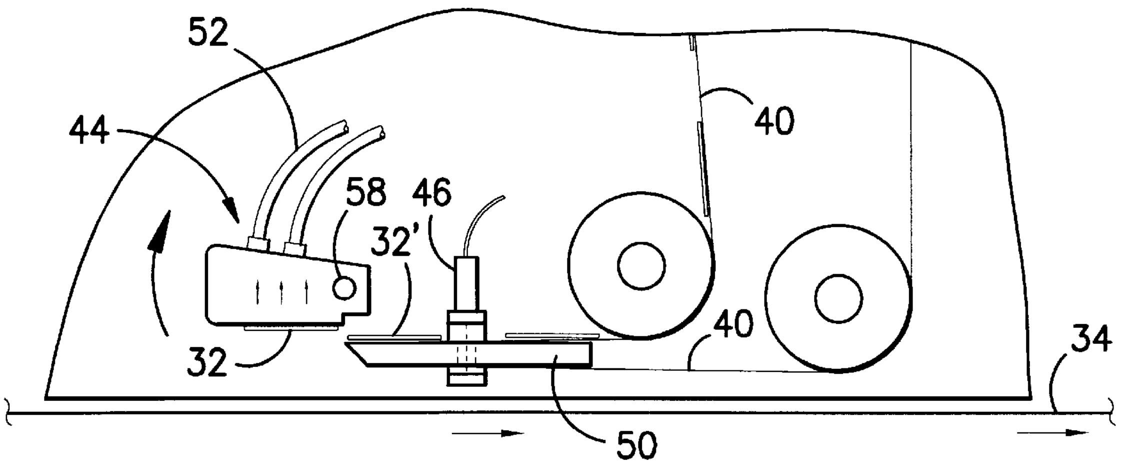
Figure 3D:
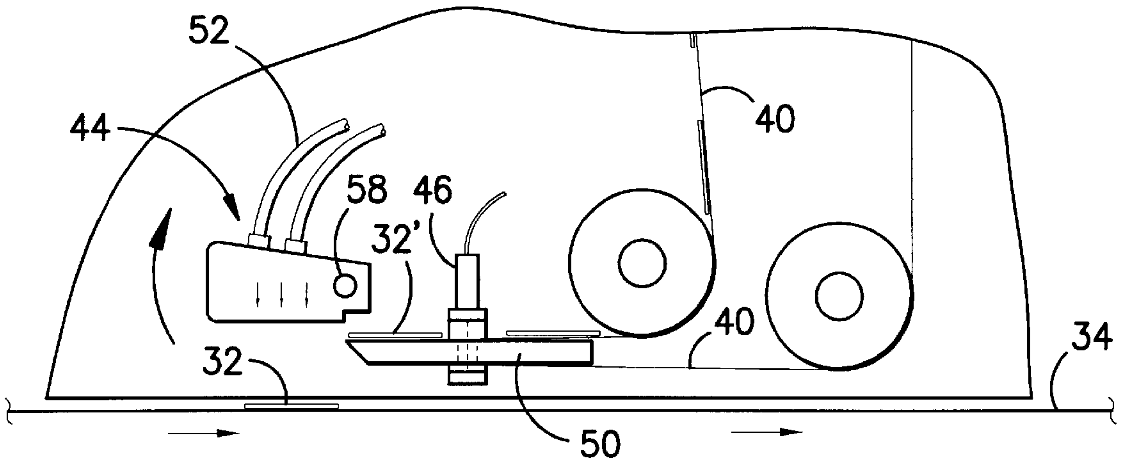

As illustrated in FIG. 3C, the procedure of peeling the label element 32 away from the carrier tape 40 is preferably completed by swinging the label discharge mechanism 44 downwardly around a pivot point 54 so as to bring the label element 32 into a substantially parallel relation to the moving web 34. As shown, the pivot point is preferably selected so as to move the underside of the label discharge mechanism away from the take-off plate 50 as such rotation takes place thereby effecting a corresponding lateral movement of the label element 32 away from the take-off plate 50 and carrier tape 40 carried thereon. Such outward movement avoids any possible interference between the label discharge mechanism 44 and the take-off plate 50 during subsequent label application. While the use of such an articulating label discharge mechanism is potentially preferred, it is likewise contemplated that a number of alternative embodiments and practices may also be utilized. By way of example only, and not limitation, it is contemplated that the label discharge mechanism 44 may be stationary and that the take-off plate 50 may be moveable in a substantially linear manner so as to bring the label element 32 into an underlying relation with such label discharge mechanism 44.

Regardless of the mechanism which may be utilized to load the label element 32 onto the label discharge mechanism 44, according to the preferred practice of the invention the label element 32 will ultimately assume an operative position some lateral distance from the take-off plate 50 and substantially parallel relative to the moving web 34 as illustrated in FIG. 3C. Upon actuation by the applicator programmable logic controller, the vacuum across the discharge mechanism 44 is terminated and is replaced with a pressurized driving force in the form of compressed air communicated through the feed lines 52 so as to cause forcible dispatch of the retained label element 32 away from the label discharge mechanism 44 and onto the moving web 34. In the illustrated and potentially preferred embodiment of the present invention this dispatch is achieved by blowing the label element 32 into place without the use of mechanical contact between the label discharge mechanism 44 and the moving web 34. Such placement procedure is believed to have the advantage of accommodating webs of varying thickness without the need for adjustment of the label discharge mechanism 44. As illustrated, the adhesive bearing surface of the label element 32 which was previously in contact with the carrier tape 40 is thereby placed into contact with the moving web 34 so as to hold the label element 32 in place on the web 34.

As previously discussed, the actuation of this discharge procedure is initiated by the applicator programmable logic controller 24 before the location to be marked reaches the application zone directly opposing the label discharge mechanism 44. The duration of such lead time is dependent upon the instantaneous speed of the moving web 34 and is calculated such that the location designated to receive the label element 32 will reach the position opposing the label discharge mechanism 44 as the placement of the label element 32 is completed.

In the event that another label is to be applied, once the placement of a label element 32 has been completed the label discharge mechanism 44 may immediately or after a delay return to a position as illustrated in FIG. 3A for acceptance of a new label element. Upon the label discharge mechanism 44 assuming the position for acceptance of a new label element, the stepper motor 42 is activated and commences to pull the carrier tape supporting the new label element 32 around the nose of the take-off plate 50 as shown in FIG. 3B. As the label element 32 is being loaded onto the label discharge mechanism 44, the optical sensor 46 monitors the extent of travel of the carrier tape 40 and label elements carried thereon. As previously indicated, the label elements 32 are of a nature such that the optical sensor 46 can readily detect their presence. In the illustrated and potentially preferred embodiment of the present invention, the optical sensor 46 is arranged along the length of the take-off plate 50 at a position such that during the loading of the leading label element 32 onto the label discharge mechanism 44 the trailing label element 32' will travel past the optical sensor 46. Once the trailing label element 32' has passed the optical sensor 46, the optical sensor 46 preferably sends a signal to terminate further movement of the carrier tape 40. Thus, through selection of the location for the optical sensor 46, movement of the carrier tape 40 may be terminated precisely when the label element 32' reaches the appropriate position for subsequent loading onto the label discharge mechanism 44.

As indicated previously, the adhesive as is utilized on the label elements 32 is preferably of a substantially releasable nature such that the label elements 32 may be peeled away from the carrier tape 40 as well as from the moving web 34. In order to enhance the adhesion of such releasable adhesive, the label discharge mechanism 44 is preferably maintained in a heated condition at about 30 to 80 degrees Fahrenheit above ambient.

In the potentially preferred embodiment of the present invention, a placement sensor 56 (FIG. 2) is utilized to confirm the placement and adhesion of the label elements 32 as they are applied to the moving web 34. For label elements 32 which are of a metallic character, the placement sensor 56 is preferably a metallic sensor such as the model AT1-AP-4A inductive proximity sensor available from Automationdirect.com which is believed to have a place of business in Cumming, Ga. USA. In the event that a label is not detected by the placement sensor 56 at the proper placement location, an alarm is sounded and an error message is communicated to the operator display terminal 29. Of course, other appropriate sensors as may be known to those of skill in the art may be used to detect the placement of nonmetallic labels.

Due to the fact that the label applicator 30 according to the present invention preferably utilizes two substantially independent systems for placement of labels 32 along the moving web 34, these dual systems may be used either independently or in conjunction with one another to effect the desired placement of labels. That is, the label discharge mechanisms 44 may be used alternately to place individual label elements 32 upon the moving web 34 or may be operated substantially independently of one another. Moreover, in the event that one or more components of either system becomes dysfunctional, it is contemplated that label application may nonetheless proceed using the components of the other application system until necessary repairs may be undertaken. By way of example, the dual systems may be used to mark the beginning and the end of running defects as may occur along the length of the moving web 34.

As will be appreciated, in many industries and/or environments, the availability of space is limited. In such environments, the label application unit 30 of the present invention may be adjusted to carry out the label placement function when the web 34 is in a non-horizontal position. As best illustrated in FIG. 4, the label application unit 30 according to the present invention is adaptable to virtually any position through the positional adjustment of a supporting rail structure 60 relative to the structural frame 31. Moreover, the label application unit 30 is capable of movement along the length of the rail structure 60 so as to track the edge of the moving web 34 such that label placement relative to the edge is consistent regardless of variations in the path of travel of the moving web 34. Such tracking is preferably carried out in a manner well known to those of skill in the art through use of two retroreflective photoelectric sensors in opposing relation to a reflective surface over which the web 34 is conveyed. One of the sensors is arranged to be slightly outboard of the edge of the web 34 while the other of the sensors is oriented to be slightly inboard of the edge of the web 34. In the event that the desired alignment is lost, the label application unit 30 is moved along the length of the rail structure 60 until proper alignment is regained.

As shown, the supporting rail structure 60 is preferably carried on a cross support member 62 which is connected to an adjustable flange member 64. The adjustable flange member 64 is connected to the structural frame 31 by a plurality of threaded holes which accept bolts 68 extending through arcuate openings 70 within the adjustable flange member 64. Thus, by loosening and/or removing the bolts 68, the adjustable flange member 64 may be rotated until the supporting rail structure 60 is in the desired position at which point the bolts 68 may be reapplied and tightened so as to place the adjustable flange member 64 into a secure position. Due to the fact that the arcuate openings 70 extend in segmented fashion substantially around the entire perimeter of the adjustable flange member 64, the supporting rail structure 60 can be oriented at virtually any position around the 360° perimeter of the adjustable flange member. The supporting rail structure 60 may thereafter be attached to any suitable stand 72 or other suitable structures such as in overhead hanging support as may be desired.

Figure 5:
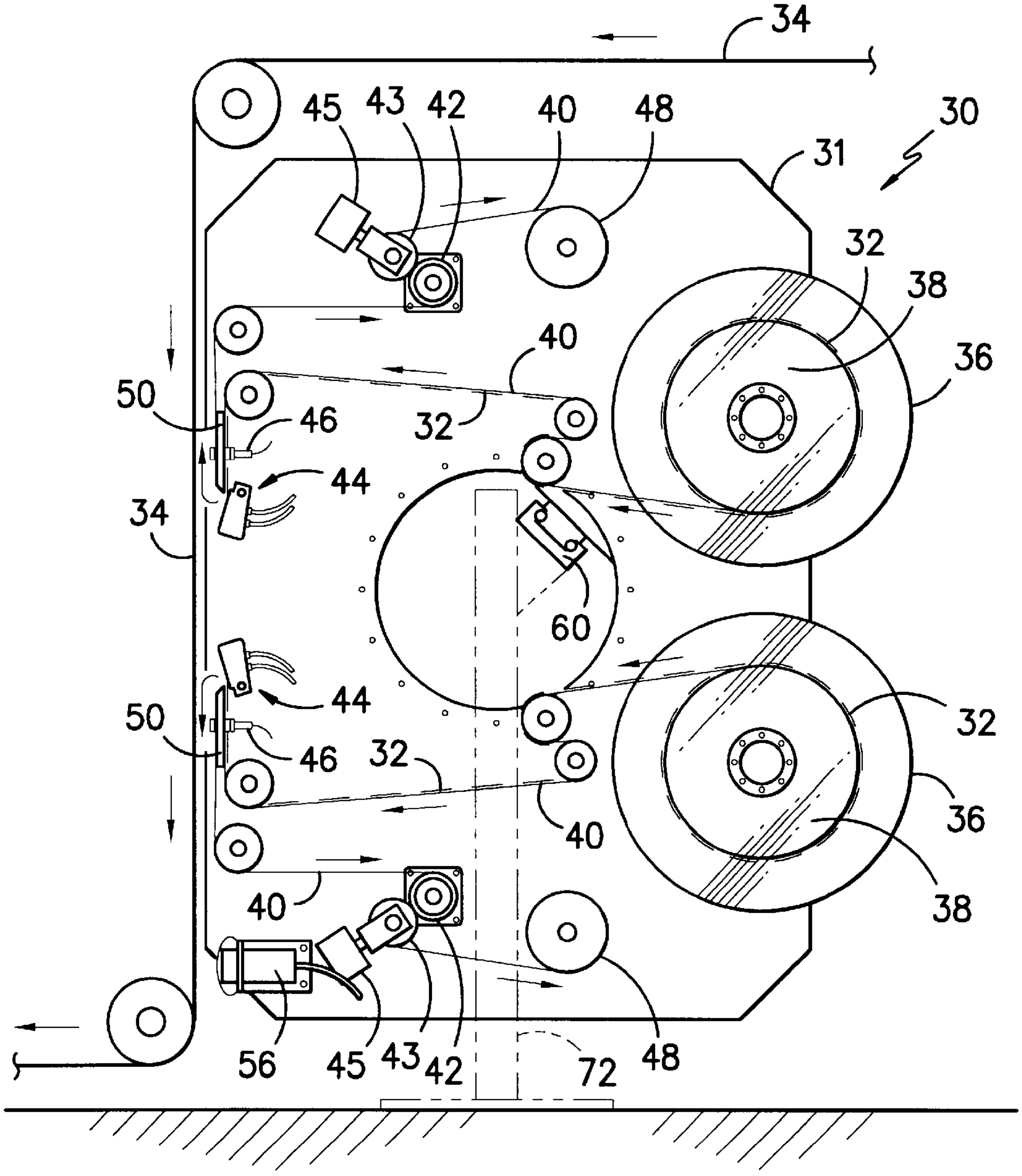
FIG. 5 illustrates the label application unit of FIG. 1 rotated approximately 90° to accommodate a substantially vertical web conveyance path.

By way of example only, and not limitation, an orientation for the label applicator 30 to accommodate a moving web 34 moving substantially vertically is illustrated in FIG. 5. As will be appreciated, such an orientation is achieved by rotating the adjustable flange member 64 and corresponding supporting rail structure 60 approximately 90° from the position illustrated in FIG. 4. Operation of the label applicator 30 in such a position is in all respects identical to that as previously discussed with respect to the horizontal moving web.

In accordance with the above description, it may be seen that the present invention provides a useful and highly versatile device for the attachment of marking labels to webs of material. Moreover, the label application unit 30 according to the present invention is useful with webs traveling at various rates of speed as well as in various physical orientations. While the present invention has been illustrated and described in relation to particular potentially preferred embodiments, it is to be understood that such embodiments are illustrative only. Accordingly it is not the intention that the invention be limited to such illustrated and described embodiments, but rather than the invention will extend to the full spirit and scope of the claims appended hereto.

What is claimed is:

1. An application unit for applying a label at a designated label placement location along the length of a moving web of material being conveyed along a path of travel, the application unit comprising:

a label discharge mechanism mounted on a support frame in substantially opposing relation to the moving web for the discharge of said label to a defined placement zone along the path of travel of said moving web; and a control unit operatively connected to said label discharge mechanism to control actuation of said label discharge mechanism such that said control unit initiates discharge of said label from said label discharge mechanism according to a variable timing sequence based upon the rate of travel of said moving web such that said discharge of said label is initiated before the designated label placement location reaches the defined placement zone and said label is applied to the designated placement location as the designated label placement location passes through the defined placement zone, wherein said support frame is rotatably adjustable to the angle of the path of travel of said moving web such that said label discharge mechanism may be supported in substantially opposing relation to said moving web at locations along the path of travel of said moving web where said moving web is in a substantially non-horizontal orientation.

2. The invention according to claim 1, wherein the time between initiation and completion of label placement is in the rang of about 20 milliseconds or less.

3. The invention according to claim 1, wherein said label discharge mechanism comprises a reversible vacuum grid for holding said label in place in preparation for discharge and wherein said reversible vacuum grid may be pressurized during discharge to force said label towards said moving web of material.

4. The invention according to claim 3, wherein said vacuum grid is moveable in articulating fashion to accept said label prior to discharge.

5. The invention according to claim 4, wherein said vacuum grid is maintained in a heated condition.

6. The invention according to claim 1, wherein said application unit includes two label discharge mechanisms.

7. The invention according to claim 6, wherein each of said two label discharge mechanisms comprises a reversible vacuum grid which may be pressurized during discharge to force said label towards said moving web of material.

8. The invention according to claim 7, wherein each of said two label discharge mechanisms comprises a reversible vacuum grid which is moveable in articulating fashion to accept said label prior to discharge.

9. The invention according to claim 8, wherein each of said two label discharge mechanisms may be operated independently.

10. The invention according to claim 1, wherein said label discharge mechanism comprises an articulating vacuum grid which accepts said label from a label support surface and transports said label laterally away from said label support surface prior to discharge.

11. The invention according to claim 1, wherein said support frame is adjustable around an angle of about 90 degrees or more.

12. The invention according to claim 1, wherein said support frame is adjustable around an angle of about 180 degrees or more.

13. The invention according to claim 1, wherein said support frame is adjustable around an angle of about 360 degrees.

14. An application unit for applying a plurality of labels at designated label placement locations along the length of a moving web of material being conveyed along a path of travel, the application unit comprising:

a plurality of independently operable label discharge mechanisms mounted on a support frame in substantially opposing relation to the moving web for the discharge of said labels to defined placement zones in substantially opposing relation to said label discharge mechanisms along the path of travel of said moving web, wherein said label discharge mechanisms comprise reversible vacuum grids for holding said labels in place and wherein said reversible vacuum grids may be pressurized to force said labels towards said moving web of material; and a control unit operatively connected to said label discharge mechanisms to control actuation of said label discharge mechanisms such that said control unit initiates discharge of said labels from said label discharge mechanisms according to a variable timing sequence based upon the rate of travel of said moving web such that said discharge of said labels is initiated at a predetermined time before the designated label placement locations reach the defined placement zones and wherein said support frame is rotatably adjustable to the angle of the path of travel of said moving web such that said reversible vacuum grids may be supported in substantially opposing relation to said moving web at locations along the path of travel of said moving web where said moving web is in a substantially non-horizontal orientation.

15. The invention according to claim 14, further comprising a sensor to monitor adhesion of said labels to said moveable web.

16. The invention according to claim 14 wherein said support frame is rotatably adjustable around any angle from 0 to 360 degrees.

17. The invention according to claim 14 wherein said reversible vacuum grids are heated.

18. An application unit for applying a plurality of labels at designated label placement locations along the length of a moving web of material being conveyed along a path of travel, the application unit comprising:

two substantially parallel independently operable label discharge mechanisms for the discharge of said labels to defined placement zones in substantially opposing relation to said label discharge mechanisms along the path of travel of said moving web, wherein said label discharge mechanisms comprise articulating heated reversible vacuum grids for holding said labels in place and wherein said reversible vacuum grids may be pressurized to force said labels towards said moving web of material; and a control unit operatively connected to said label discharge mechanisms to control actuation of said label discharge mechanisms such that said control unit initiates discharge of said labels from said label discharge mechanisms according to a variable timing sequence based upon the rate of travel of said moving web such that said discharge of said labels is initiated at a predetermined time before the designated label placement locations reach the defined placement zones, said application unit being rotatable around angles from 0 to about 360 degrees.

* * * * *